Sept. 18, 1928.  1,684,763
W. G. FRITTS
TIRE SPLITTING MACHINE
Filed April 18, 1927   2 Sheets-Sheet 1

Inventor
W. G. Fritts
By C.A.Snow & Co.
Attorneys.

Sept. 18, 1928.

W. G. FRITTS 1,684,763

TIRE SPLITTING MACHINE

Filed April 18, 1927  2 Sheets-Sheet 2

Inventor
W. G. Fritts
By C. A. Snow & Co.
Attorney

Patented Sept. 18, 1928.

1,684,763

UNITED STATES PATENT OFFICE.

WILFRED G. FRITTS, OF LEXINGTON, NORTH CAROLINA.

TIRE-SPLITTING MACHINE.

Application filed April 18, 1927. Serial No. 184,667.

This invention relates to a machine designed primarily for splitting the rubber treads from automobile tires, one of the objects being to provide a structure of this character which will hold the tire flat and under tension as it is fed past a knife used for cutting the tread portion from the tire.

A further object is to provide a machine in which the tire can be placed readily and can be easily removed, the said tire being maintained in its endless form during the splitting operation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings.

Figure 1:
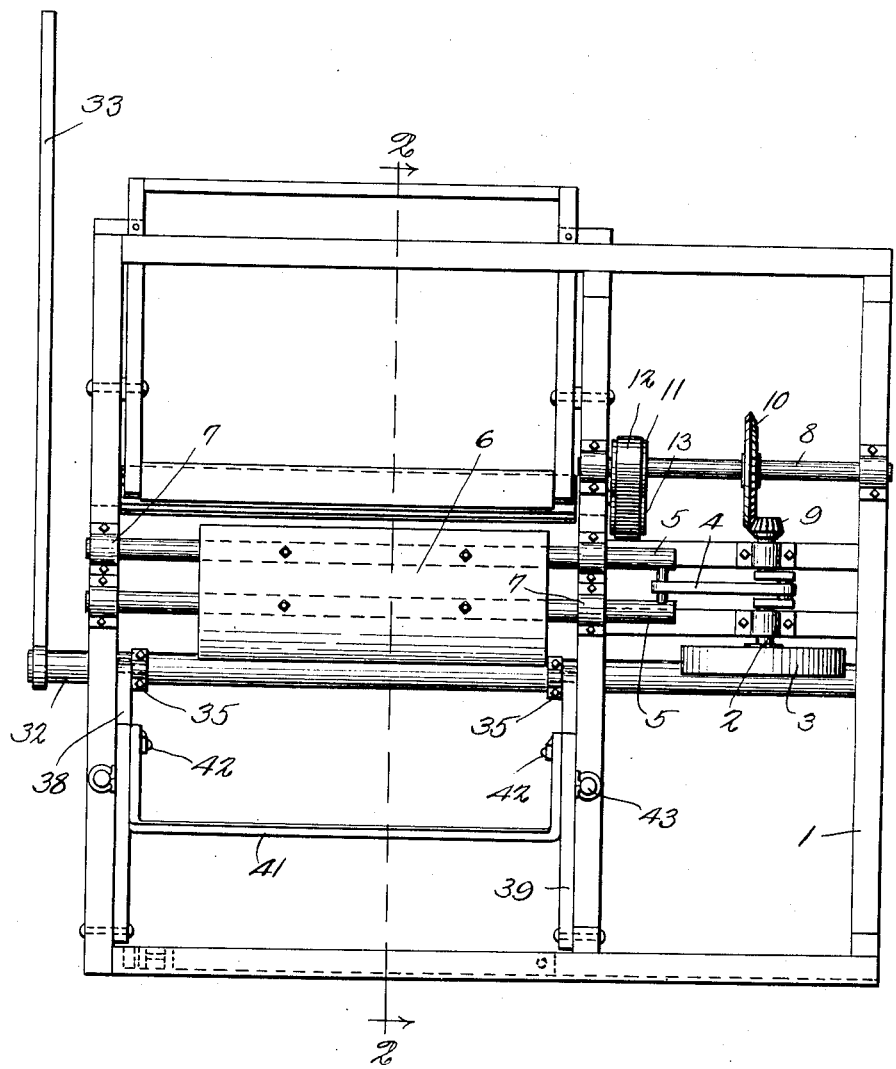
Figure 1 is a top plan view of the machine.
Figure 2:
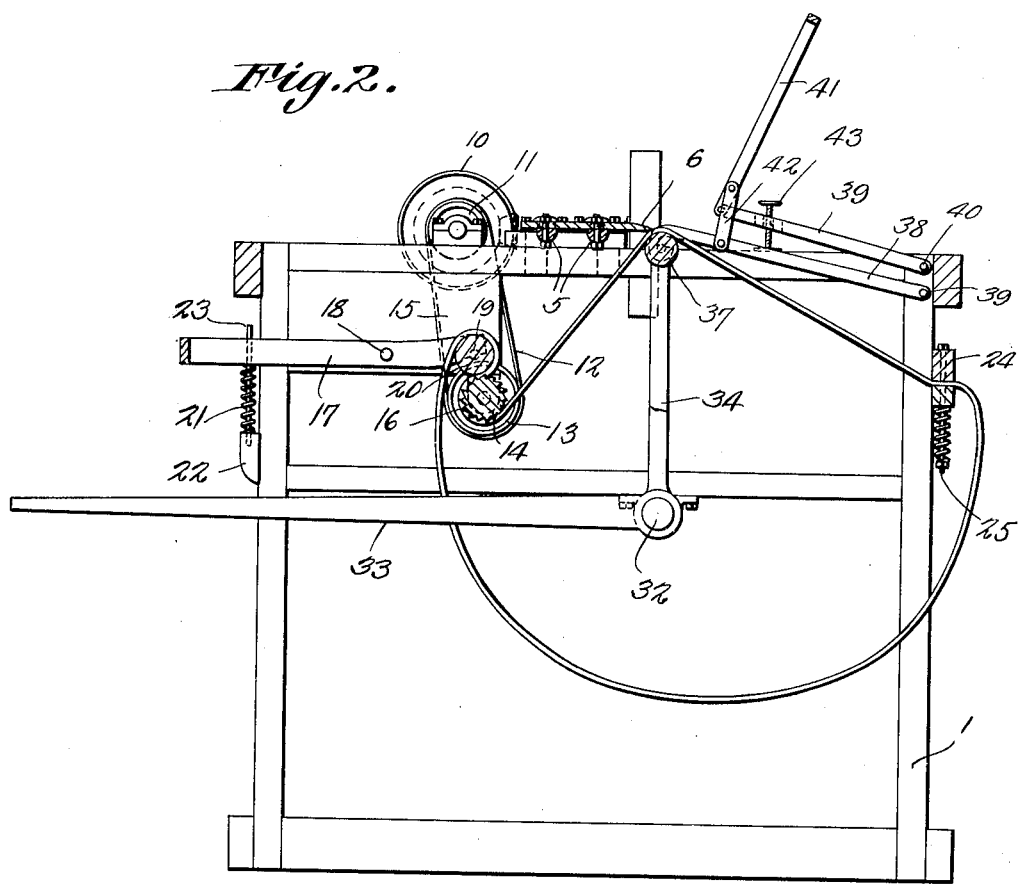
Figure 2 is a section on line 2—2, Figure 1, a tire being shown in position.
Figure 3:
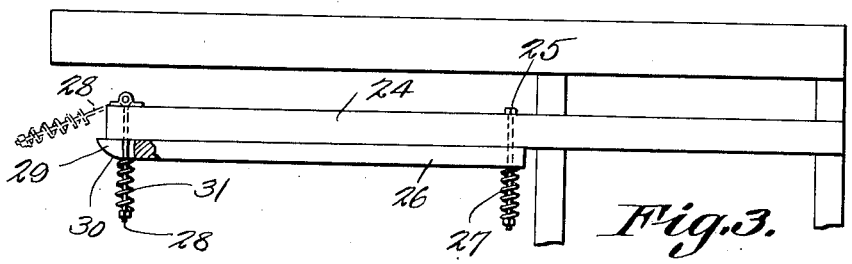
Figure 3 is an elevation of a portion of one side of the machine showing the means for gripping and retarding the tire during the gripping operation.
Figure 4:
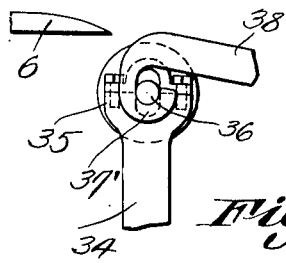
Figure 4 is an end elevation of a portion of the gripping knife, the supporting roll and adjacent parts being also shown.

Referring to the figures by characters of reference 1 designates the frame of the machine on the back portion of which may be mounted a crank shaft 2 adapted to receive motion through a pulley 3 from any suitable source of power. The crank on this shaft is connected by a pitman 4 to a slide 5 adapted to reciprocate on the frame and carrying a splitting knife 6. The slide can be formed of parallel rods mounted in bearings 7, as shown, the blade constituting the connection between the rods. This is clearly shown in Figures 1 and 2.

Another shaft 8 can be arranged at right angles to the shaft 2 and gears 9 and 10 can be employed for transmitting motion thereto. This shaft has a pulley 11 for transmitting motion through a belt 12 to another pulley 13 rotatable with a pulling roll 14 journaled within hangers 15. This roll is provided with longitudinal angular ribs 16.

A frame 17 is fulcrumed at 18 within the structure 1 and has notches in the lower edges of the sides thereof above the roll 14 for the reception of the trunnions 19 extending from the ends of a gripping roll 20. Springs 21 are interposed between the outer portion of the frame 17 and supporting brackets 22, these springs being mounted on rods 23 projecting from the brackets 22 and loosely through the sides of the frame 17.

Arranged across one side of the main structure or frame 1 is a stationary retarding strip 24 having a rod 25 extending downwardly therethrough and through one end portion of a movable retarding strip 26. The rod 25 extends below the strip 26 and carries a spring 27 which thrusts upwardly against the said strip 26. Another rod 28 is pivotally mounted on the stationary strip 24 and is adapted to swing into a slot 29 formed in the rounded end 30 of the movable strip 26. This rod 28 carries a spring 31 designed to press upwardly against the strip 26 when the rod 28 is seated in the slot 29.

A shaft 32 is journaled in the frame 1 and is provided, at the front of said frame, with an operating lever 33. A shaft 32 has upstanding arms 34 provided, at their upper ends, with bearings 35 for the reception of the trunnions 36 of a supporting roll 37, these bearings being so shaped as to permit the trunnions 36 to slide upwardly and downwardly within the bearings. The said trunnions project laterally beyond the bearings 35 into lifting hooks 37' carried by levers 38 fulcrumed in the frame 1 as shown at 39. These hooks are located beneath the levers and are open so that the trunnion 36 can be swung into and out of engagement with the hooks. Another lever 39 is arranged above each of the levers 38 and is fulcrumed on the frame 1 as indicated at 40. To these levers 39 are pivotally connected the side portions of an operating bail 41. The sides of this bail are connected by links 42 to the sides of the levers 38. Downward movement of the levers 39 is limited by stop screws 43 carried thereby and adapted to bear on the frame 1. In practice the bail 41 is swung downwardly onto or between the levers 39 so that the links 42 will bring the levers 38 downwardly onto the trunnions 36. Said trunnions can then be swung out of engagement with the hooks 37' by lifting upwardly on the outer end of lever 38, thereby causing the arms 34 to swing backwardly, carrying the supporting roll 37 with them.

The removable retarding strip 26 is disengaged from the rod 38. After the beads have been cut from the tread portion of the tire to be split, said tire is slipped over the lever 33 so as to extend around shaft 32. A portion of the tire is then placed on the supporting roll 37 while another portion is placed between the retarding strips 24 and 26. Thereafter the rod 28 and spring 21 are swung into engagement with the strip 36. Another part of the tire is then looped around the roll 14 and the clamping or gripping roll 20 is inserted through the loop. The trunnions 19 of this roll 20 are then placed beneath the sides of the frame 17, the outer portion of said frame having first been depressed against the action of the springs 21. When the frame is released the springs 21 will return it to normal position so that the trunnions 19 will become seated within the notches in the inner end portions of the sides of the frame 17. The mechanism is then set in motion and the knife 6 will be caused to reciprocate rapidly. Lever 33 is swung downwardly so as to cause the supporting roll 37 to swing upwardly to position adjacent the path of the cutting blade and with the trunnions 36 within the hooks 37'. The operator then pulls upwardly on the bail 41. This will cause the links 42 to pull on the levers 38 which, in turn, will raise the hooks 37' and lift the trunnions 36. Consequently the roll 37 will be elevated to press the tread portion of the tire into engagement with the edge of the reciprocating knife 6. The rotating roll 16 will pull on the tire and as the movement of the tire is retarded by the gripping action of the strips 24 and 26, said tire will be held taut as it passes over the roll 37 and against the knife. The tire will be pulled gradually past the knife and this knife, while reciprocating, will cut into the tread and strip it from the tire. This operation will continue until the entire tread has been removed whereupon, by depressing frame 17, removing roll 20, loosening strip 26 and swinging roll 37 away from the knife, the stripped tire can be removed. A new tire can then be placed in the machine and the operation proceeded with as before.

By means of the adjusting screws 43 the depth of the cut made by the knife through the tread can be regulated.

What is claimed is:

1. A machine for splitting tires including a knife, means for supporting an endless tire in position for engagement by the knife, means for pulling the tire while in engagement with the knife, means for reciprocating the knife transversely of the engaged portion of the tire, and means for gripping the tire to hold it taut during the pulling action.

2. A machine for splitting pneumatic tires, including a knife mounted for movement, means for frictionally engaging the tire, means for pulling the tire to hold a portion of it taut, and shiftable means for feeding the taut portion of the tire to the knife.

3. A machine for splitting pneumatic tires, including a pulling roll, detachable means for holding a portion of an endless tire looped partly around said roll and bound thereupon, means for frictionally gripping a portion of the tire, said roll and gripping means cooperating to hold a portion of the tire taut during the actuation of the tire by the pulling roll, a splitting knife movably mounted, and means for feeding the taut portion of the tire to the knife.

4. A machine for splitting pneumatic tires, including means for frictionally engaging a portion of an endless tire, a roll for pulling the tire in the direction of its length, said pulling and gripping means cooperating to hold a portion of the tire taut, a knife mounted for movement, a roll for supporting the taut portion of the tire adjacent the knife, and means for shifting the roll to feed the tire into and out of the path of the knife.

5. A machine for splitting pneumatic tires, including tire gripping means, a pulling roll adjacent the tire, a removable gripping roll insertable into a loop formed by the tire extending partly around the pulling roll, yielding means for binding the tire between said rolls, a movably mounted knife, a supporting roll for holding a portion of the tire close to the knife, and means for shifting said roll to move the tire into and out of the path of the knife, the pulling roll and gripping means cooperating to hold taut that portion of the tire fed to the knife.

6. In a machine for splitting pneumatic tires, a knife movably mounted, a roll for supporting an endless tire close to the knife, means for shifting the roll to feed said tire into and out of the path of the knife, and means for holding taut that portion of the tire adjacent the knife, said means including mechanism for moving the tire circumferentially.

7. A machine for splitting pneumatic tires, including yieldingly connected means for gripping an endless tire, rotatable means engaging the tire for pulling it circumferentially and cooperating with the gripping means to hold a portion of the tire taut, a knife mounted for reciprocation, a roller for supporting the taut portion of the tire adjacent the knife, and means for shifting the roller relative to the knife to feed the tire into the path of the knife during the movement of said tire by the roll.

8. A machine for splitting pneumatic tires including a knife mounted for reciprocation, a pulling roll for engagement with an endless tire, a roll insertable through the tire, yielding means engaging the inserted roll to hold a portion of the tire looped partly around the pulling roll and clamped thereagainst, yieldingly connected fixed and movable gripping members engaging the tire, one of said members being insertable into the tire, whereby the tire will extend transversely of the members gripping the same, a supporting roll, a movable support therefor shiftable to position the roll and a part of the tire close to the knife, and means for shifting the supporting roll relative to its support to feed the moving tire into and out of the path of the knife.

In testimony that I claim the foregoing as my own, I have hereto affixed my signature.

WILFRED G. FRITTS.